United States Patent
Lee

(10) Patent No.: US 7,649,563 B2
(45) Date of Patent: Jan. 19, 2010

(54) DIGITAL PHOTOGRAPHING APPARATUS THAT ADAPTIVELY DISPLAYS ICONS AND METHOD OF CONTROLLING THE DIGITAL PHOTOGRAPHING APPARATUS

(75) Inventor: Seung-yun Lee, Seongnam-si (KR)

(73) Assignee: Samsung Digital Imaging Co., Ltd., Suwon-si (KR)

( * ) Notice: Subject to any disclaimer, the term of this patent is extended or adjusted under 35 U.S.C. 154(b) by 655 days.

(21) Appl. No.: 11/089,740

(22) Filed: Mar. 25, 2005

(65) Prior Publication Data

US 2006/0103751 A1 May 18, 2006

(30) Foreign Application Priority Data

Nov. 18, 2004  (KR) .................. 10-2004-0094552

(51) Int. Cl.
*H04N 5/222* (2006.01)
(52) U.S. Cl. ............................... 348/333.02
(58) Field of Classification Search .......... 348/333.02
See application file for complete search history.

(56) References Cited

U.S. PATENT DOCUMENTS 5,541,656 A * 7/1996 Kare et al. ............ 348/333.02
6,310,648 B1 * 10/2001 Miller et al. ........... 348/333.05
6,441,854 B2 * 8/2002 Fellegara et al. ....... 348/333.13
2003/0090572 A1 * 5/2003 Belz et al. ................ 348/207.1
2003/0090585 A1 * 5/2003 Anderson ............... 348/333.11
2004/0119876 A1 6/2004 Ohmori et al.
2004/0179123 A1 * 9/2004 Cazier .................... 348/333.02
2004/0217984 A1 * 11/2004 Borden, IV ................ 345/723
2005/0216862 A1 * 9/2005 Shinohara et al. ........... 715/825
2006/0181630 A1 * 8/2006 Shioji et al. ............ 348/333.01

FOREIGN PATENT DOCUMENTS

CN         1373595 A        10/2002
JP         11313229 A    *  11/1999
WO      WO 03/028364 A1     4/2003

OTHER PUBLICATIONS

Sony Corporation, "Online User Manual and Guide for Sony Cyber-Shot DSC-P92 Digital Camera," retrieved from website: http://www.fixya.com/support/p325603-sony_cyber_shot_dsc_p92_digital_camera/manual-15724 (Dec. 31, 2003).

* cited by examiner

Primary Examiner—James M Hannett
(74) Attorney, Agent, or Firm—Drinker Biddle & Reath LLP

(57) ABSTRACT

Provided are a digital photographing apparatus that displays a preview image and overlaps setting icons indicating set operating conditions of the digital photographing apparatus and a method of controlling the digital photographing apparatus. If a user does not generate a signal within a set period of time, the setting icons are no longer displayed.

22 Claims, 10 Drawing Sheets

DIGITAL PHOTOGRAPHING APPARATUS THAT ADAPTIVELY DISPLAYS ICONS AND METHOD OF CONTROLLING THE DIGITAL PHOTOGRAPHING APPARATUS

BACKGROUND OF THE INVENTION

This application claims the priority of Korean Patent Application No. 10-2004-0094552, filed on Nov. 18, 2004, in the Korean Intellectual Property Office, the disclosure of which is incorporated herein in its entirety by reference.

1. Field of the Invention

The present invention relates to a digital photographing apparatus and a method of controlling the same. More particularly, the present invention relates to a digital photographing apparatus that displays a preview image and overlaps the preview image with setting icons indicating set operating conditions of the digital photographing apparatus and a method of controlling the digital photographing apparatus.

2. Description of the Related Art

A conventional digital photographing apparatus is disclosed in U.S. Patent Publication No. 2004/119,876 entitled "Method of Notification of Inadequate Picture Quality." In this disclosure, a preview image that is input through an optical system and setting icons indicating set operating conditions of the digital photographing apparatus are displayed together, with the setting icons overlapping the preview image.

When such a conventional digital photographing apparatus is used, a user has to operate several buttons to terminate the display of the setting icons. Accordingly, for a quick photographing operation, the user has to capture the preview image while it is made unclear by the setting icons since the user cannot quickly remove the setting icons from a screen.

SUMMARY OF THE INVENTION

Various embodiment of the present invention provide a digital photographing apparatus and a method of controlling the same, wherein the apparatus and method minimize inconvenience in a photographing operation caused by displaying setting icons that indicate operating conditions of the digital photographing apparatus.

According to an embodiment of the present invention, there is provided a digital photographing apparatus that (1) displays a preview image and overlaps it with displayed setting icons indicating set operating conditions of the digital photographing apparatus, and (2) stops displaying the setting icons if a user does not generate a signal within a set period of time.

In the method, a user can adjust a set period of time in advance, thereby removing setting icons from a screen at appropriate timing without manipulating additional buttons. Therefore, inconvenience in a photographing operation caused by displaying the setting icons can be minimized.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE PREFERRED EMBODIMENTS

Figure 1:
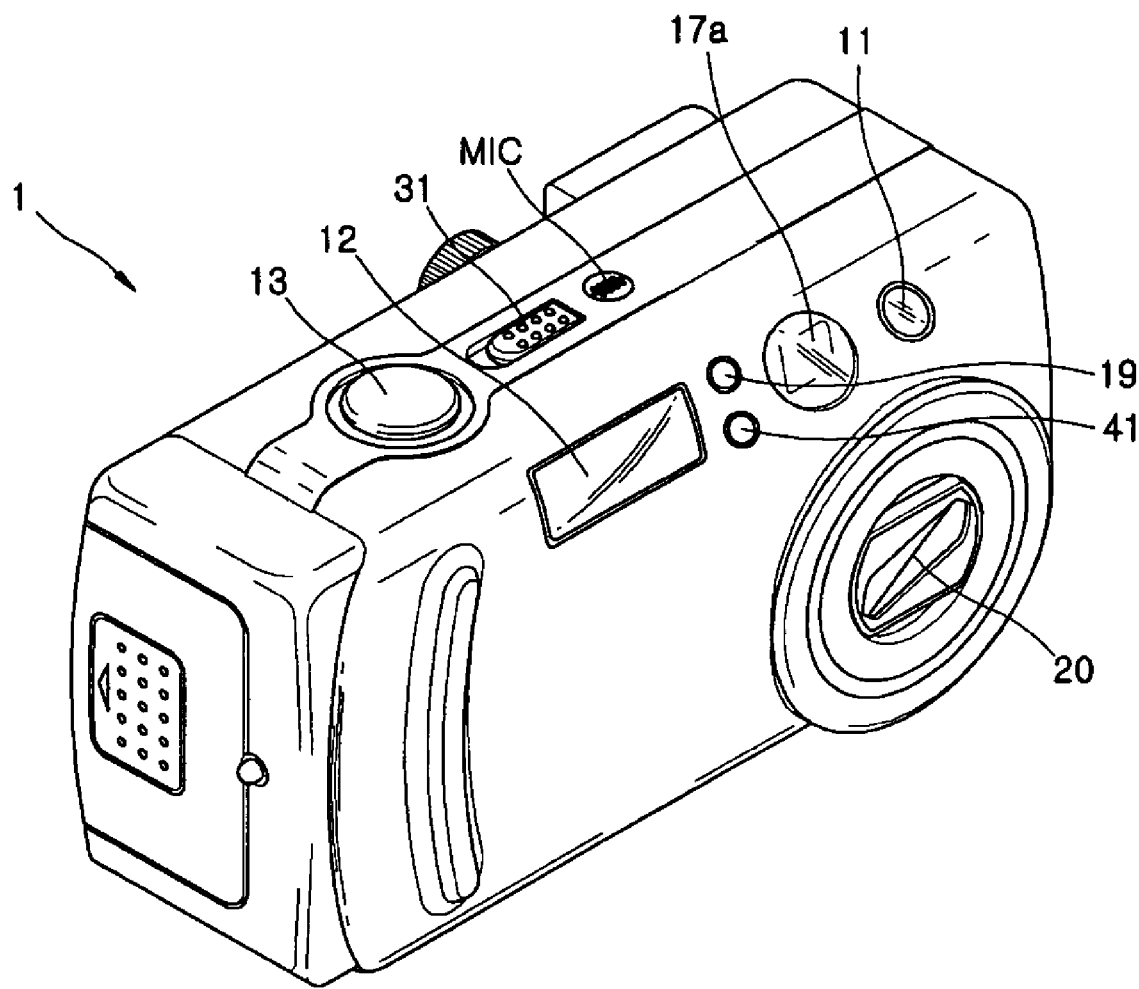
FIG. 1 is a perspective view illustrating the front and the top of a digital camera according to an embodiment of the present invention.

Referring to FIG. 1, the front part of a digital camera 1 according to an embodiment of the present invention includes a self-timer lamp 11, a flash 12, a viewfinder 17a, a flash-luminance sensor 19, a lens unit 20, and a remote receiver 41. The top of the digital camera 1 includes a microphone MIC, a shutter release button 13, and a power switch 31.

In a self-timer mode, the self-timer lamp 11 operates for a set period of time from the time when the shutter release button 13 is pressed to the time when an image starts to be captured. When the flash 12 operates, the flash-luminance sensor 19 senses luminance and relays the sensed luminance to a digital camera processor (DCP) 507 of FIG. 3 via a micro-controller 512 of FIG. 3. The remote receiver 41 receives command signals, for example, a photographing command signal, from a remote controller (not shown) and relays the photographing command signal to the DCP 507 via the micro-controller 512.

The shutter release button 13 has two levels. In other words, referring to FIG. 8, when a user lightly depresses the shutter release button 13 to a first level, a first level signal SH1 from the shutter release button 13 is turned on. When the user fully depresses the shutter release button 13 to a second level, a second level signal SH2 from the shutter release button 13 is turned on.

Figure 2:
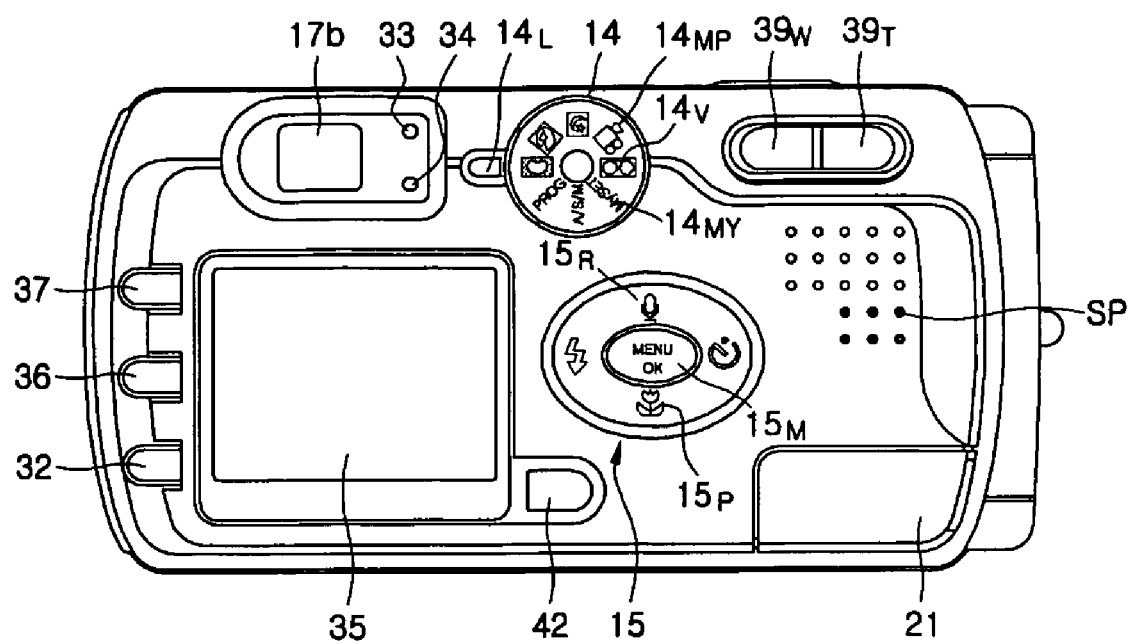
FIG. 2 is a perspective view illustrating the back of the digital camera of FIG. 1.

Referring to FIG. 2, the back of the digital camera 1 according to an embodiment of the present invention includes a mode dial 14, functional buttons 15, a manual focus/delete button 36, a manual adjust/reproduce/terminate button 37, a reproduction mode button 42, a speaker SP, a monitor button 32, an automatic focusing lamp 33, a viewfinder 17b, a flash standby lamp 34, a color LCD panel 35, a wide-angle zoom button $39_W$, a telephoto zoom button $39_T$, and an external interface unit 21.

The mode dial 14 is used for selecting the operating modes of the digital camera 1. For example, a user may select modes such as a simple photographing mode, a program photographing mode, a character photographing mode, a night-view photographing mode, a manual photographing mode, a moving-image photographing mode, a user-setting mode $14_{MY}$, and an audio recording mode $14_V$.

The user-setting mode $14_{MY}$ is an operating mode in which a user selects photograph-taking settings for each photographing mode. Reference numeral $14_{MP}$ indicates the moving-image photographing mode. The audio recording mode $14_V$ is for recording only sounds, for example, a user's voice. After selecting the audio recording mode $14_V$, when a user presses the shutter release button 13, an audio file is created in the memory card and audio data is stored in the audio file. When the user presses the shutter release button 13 again, the audio data stops being stored and the audio file is set.

The functional buttons 15 are used for operating specific functions of the digital camera 1. The functional buttons 15 are also used as control buttons to manage the movement of an active cursor on the menu screen of the color LCD panel 35.

In a reproduction mode, if an image currently displayed is not enlarged, when the user presses a self-timer/right button $15_R$, a next file in a forward direction is displayed. If an image currently displayed is enlarged, when the user presses the self-timer/right button $15_R$, a display area of the enlarged image is moved to the right. In a preview mode, if the user presses the self-timer/right button $15_R$, a self-timer operation, e.g., automatic photographing after 10 seconds, is performed.

In the reproduction mode, if the image currently displayed is not enlarged, when the user presses a flash/left button $15_L$, a next file in a reverse direction is displayed. If the image currently displayed is enlarged, when the user presses the flash/left button $15_L$, the display area of the enlarged image is moved to the left. In the preview mode, if the user presses the flash/left button $15_L$, any one of the flash modes for a photographing mode is set.

In the reproduction mode, if the image currently displayed is enlarged, when the user presses a macro/down button $15_D$, the display area of the enlarged image is moved down. In the preview mode, the user may set automatic proximity focusing by pressing a macro/down button $15_D$.

In the reproduction mode, when the image currently displayed is enlarged, if the user presses a voice-memo/up button $15_U$, the display area of the enlarged image is moved up. In the preview mode, if the user presses the voice-memo/up button $15_U$, a 10 second recording is possible upon consecutive photographing.

In a setting mode, if the user presses a menu/select-confirm button $15_M$ when the active cursor is on a selection menu, the operation corresponding to the selection menu is performed.

The manual adjust/reproduce/terminate button 37 is used for manual adjustment of specific conditions. In the reproduction mode, when the user presses the manual adjust/reproduce/terminate button 37, a selected moving-image file may be reproduced or its reproduction may be terminated.

The manual focus/delete button 36 is used for manual focusing or deleting in the photographing mode.

The monitor button 32 is used for controlling the operation of the color LCD panel 35. For example, in the photographing mode, when the user presses the monitor button 32, an image and photographing information are displayed on the color LCD panel 35. When the user presses the monitor button 32 again, the color LCD panel 35 is turned off. In the reproduction mode, when the user presses the monitor button 32 while an image file is being reproduced, photographing information about the image file is displayed on the color LCD panel 35. When the user presses the monitor button 32 again, only images are displayed.

The reproduction mode button 42 is used for switching between the reproduction mode and the preview mode.

The automatic focusing lamp 33 operates when automatic focusing is completed. The flash standby lamp 34 operates when the flash 12 of FIG. 1 is in a standby mode. A mode indicating lamp $14_L$ indicates a selection mode of the mode dial 14.

Figure 3:
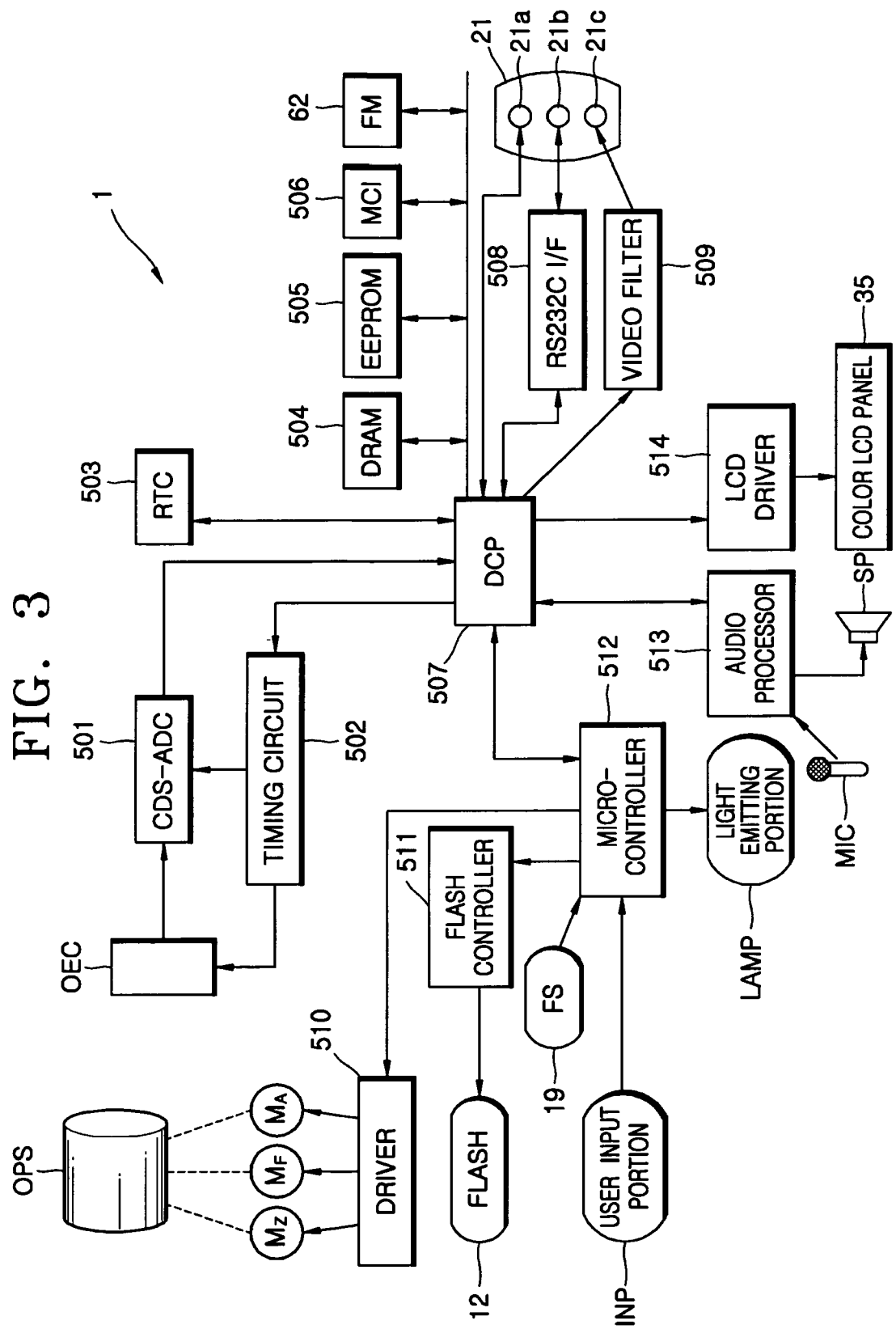
FIG. 3 is a schematic diagram of the configuration of the digital camera of FIG. 1.

FIG. 3 is a schematic diagram of the configuration of the digital camera 1 of FIG. 1. The configuration and operation of the digital camera 1 of FIG. 1 will now be described with reference to FIGS. 1 through 3.

An optical system (OPS) including the lens unit 20 and a filter unit optically processes light. The lens unit 20 of the OPS includes a zoom lens, a focal lens, and a compensation lens.

When the user presses the wide-angle zoom button $39_W$ or the telephoto zoom button $39_T$ included in a user input portion (INP), a signal corresponding to the wide-angle zoom button $39_W$ or the telephoto zoom button $39_T$ is relayed to the micro-controller 512. The micro-controller 512 controls a driver 510, thereby running a zoom motor $M_Z$, which, in turn, moves the zoom lens. In other words, when the user presses the wide-angle zoom button $39_W$, the focus length of the zoom lens becomes short, thereby widening the angle of view. When the user presses the telephoto zoom button $39_T$, the focus length of the zoom lens becomes long, thereby narrowing the angle of view. Since the position of the focus lens is adjusted in a state where the position of the zoom lens is set, the angle of view is hardly affected by the position of the focus lens.

In the automatic focusing mode, a main controller built into the DCP 507 controls the driver 510 through the micro-controller 512, thereby driving a focus motor $M_F$. Accordingly, when the focus lens is moved, the position of the focus lens, for example, a number of driving steps of the focus motor $M_F$, having a largest high frequency component of an image signal is set.

The compensation lens in the lens unit 20 of the OPS is not separately operated because the compensation lens compensates for the entire refractive index. Reference numeral $M_A$ indicates a motor for driving an aperture (not shown).

An optical low pass filter included in the filter unit of the OPS eliminates high frequency optical noise. An infrared cut filter included in the filter unit of the OPS blocks the infrared component of incident light.

A photoelectric conversion unit (OEC) of a charge coupled device or a complementary metal oxide (CMOS) semiconductor converts light from the OPS into an analog electrical signal. Here, the DCP 507 controls a timing circuit 502 to control the operations of the OEC and a correlation-double-sampler-and-analog-to-digital converter (CDS-ADC) 501. The CDS-ADC 501 processes the analog signal from the OEC, eliminates high frequency noise, adjusts amplitude, and then converts the analog signal into a digital signal.

A real time clock (RTC) 503 provides time information to the DCP 507. The DCP 507 processes the digital signal from the CDS-ADC 501 and generates a digital image composed of luminance and chromaticity values.

A light emitting portion (LAMP) is operated by the micro-controller 512 in response to a control signal generated by the DCP 507 including the main controller. The light emitting portion (LAMP) includes the self-timer lamp 11, the automatic focusing lamp 33, the mode indicating lamp $14_L$, and the flash standby lamp 34. The user input portion INP includes the shutter release button 13, the mode dial 14, the functional buttons 15, the monitor button 32, the manual focus/delete button 36, the manual adjust/reproduce/terminate button 37, the reproduction mode button 42, the wide-angle zoom button $39_W$, and the telephoto zoom button $39_T$.

A dynamic random-access memory (DRAM) 504 temporarily stores a digital image signal from the DCP 507. An electrically erasable and programmable read-only memory (EEPROM) 505 stores programs and setting data. A user's memory card is inserted into or removed from a memory card interface 506. The digital image signal from the DCP 507 is input to an LCD driver 514, thereby displaying an image on the color LCD panel 35.

The digital image signal from the DCP 507 can be transmitted as serial communications via a universal serial bus (USB) connector 21a or via an RS232C interface 508 and an RS232C connector 21b. The digital image signal from the DCP 507 can also be transmitted as a video signal via a video filter 509 and a video output unit 21c.

An audio processor 513 can relay sound from the microphone MIC to the DCP 507 or to the speaker SP. In addition, the audio processor 513 can output an audio signal from the DCP 507 to the speaker SP. The micro-controller 512 controls the operation of a flash controller 511 in response to a signal from the flash-luminance sensor 19, thereby driving the flash 12.

A main program of the DCP 507 of FIG. 3 will be now described with reference to FIGS. 1 through 4.

When power is applied to the digital camera 1, the DCP 507 is initialized (S1). After the initialization (S1), the DCP 507 performs a preview mode (S2). In the preview mode, a preview image input through the OPS and setting icons indicating set operating conditions of the digital camera 1 are displayed on the color LCD panel 35 (see FIG. 6).

Also, in the preview mode (S2), the DCP 507 drives an internal timer if the internal timer is not on. If the operating time of the internal timer exceeds a set period of time, for example, 9 seconds, the setting icons are no longer displayed since the user did not generate a signal within the set period of time. Thus, by adjusting the set period of time in advance, the user can set the digital camera 1 to cease displaying the setting icons on the display screen at appropriate timing without pressing an additional button such as the monitor button 32. Accordingly, inconvenience in a photographing operation caused by displaying the setting icons can be minimized. An operation related to the preview mode will be described in detail later with reference to FIG. 5.

When the user lightly depresses the shutter release button 13 to the first level and the first level signal SH1 from the shutter release button 13 is turned on (S3), the timer that started in the preview mode (S2) or a setting mode (S6) stops (S3a) because the timer must be driven again in the preview mode (S2) or the setting mode (S6) if the user generated a signal. The DCP 507 performs a current photographing mode (S4). The photographing mode (S4) program will be described in detail with reference to FIG. 8.

When a setting signal for setting operating conditions of the digital camera 1 is generated by the user input portion INP (S5), the timer that started in the preview mode (S2) or the setting mode (S6) stops (S5a) because the timer must be driven again in the preview mode (S2) or the setting mode (S6) if the user generated a signal.

The setting mode for setting the operating conditions of the digital camera 1 is performed in response to signals received from the user input portion INP (S6). In the setting mode, folder icons and their sub-menus for setting operating conditions of the digital camera 1 overlap the preview image and are displayed on the color LCD panel 35 (see FIGS. 10 and 11).

Also, in the setting mode (S6), the DCP 507 drives the internal timer if the internal timer is not on. If the operating time of the internal timer exceeds a set period of time, for example, 9 seconds, the DCP 507 terminates the setting mode (S6) and performs a next operation (S8) because the user has not generated a signal during the set period of time. In this case, the folder icons and their sub-menus are no longer displayed. Thus, by adjusting the set period of time in advance, the user can remove the folder icons and their sub-menus from the screen at an appropriate time without pressing an additional button such as the menu/select-confirm button $15_M$. Accordingly, inconvenience in the photographing operation caused by displaying the folder icons and their sub-menus in the user-setting mode (S6) can be minimized. An operation related to the setting mode will be described in detail later with reference to FIG. 9.

Considering that operation S5 can be performed after operation S6 is terminated, it can be understood that when the user presses a setting button and thus generates a signal, folder icons and their sub-menus corresponding to the setting button are displayed.

When a termination signal is not generated, the DCP 507 continues to perform the following operations (S7).

When a signal is generated by the reproduction mode button 42 in the user input portion INP (S8), the timer that started in the preview mode (S2) or the setting mode (S6) stops (S8a) because the timer must be driven again in the preview mode (S2) or the setting mode (S6) if the user generated a signal. In the reproduction mode, the DCP 507 performs a reproduction operation in response to the signals received from the user input portion INP. When the reproduction mode is terminated, the above operations are repeated.

The preview mode (S2) program will now be described with reference to FIGS. 1 through 3 and FIG. 5.

The DCP 507 performs automatic white balancing (AWB) and sets parameters related to the white balance (S201). The DCP 507 performs automatic exposure (S202). The DCP 507 calculates the exposure by measuring incident luminance, drives the aperture driving motor $M_A$ according to the calculated exposure, and sets a shutter speed. Then, the DCP 507 performs automatic focusing (S203).

The DCP 507 performs gamma correction on input image data (S204) and scales the gamma corrected image data to meet display standards (S205). The DCP 507 converts the scaled input image data from an RGB (red, green, and blue) format into a luminance-chromaticity format (S206). The DCP 507 processes the input image data depending on resolution and where the input image data is displayed and filters the input image data (S207).

The DCP 507 temporarily stores the input image data in the DRAM 504 of FIG. 3 (S208). The DCP 507 synthesizes the data temporarily stored in the DRAM 504 of FIG. 3 and on-screen display (OSD) data (S209). The OSD data denote data of the setting icons indicating operating conditions of the digital camera 1. The DCP 507 converts the synthesized image data from the RGB format into the luminance-chromaticity format (S210) and outputs the image data in the converted format via the LCD driver 514 of FIG. 3 (S211, see FIG. 6).

The DCP 507 drives the internal timer if the internal timer is not on (S212 and S213). If the internal timer is not driving and the digital camera 1 performs the preview mode (S2) right after being turned on, the timer is stopped in any one of operations S3a, S5a and S8a of FIG. 4 and operations S605a, S607a and S609a of FIG. 9. Here, operations S212 and S213 may be performed just before operation S201.

Figure 7:
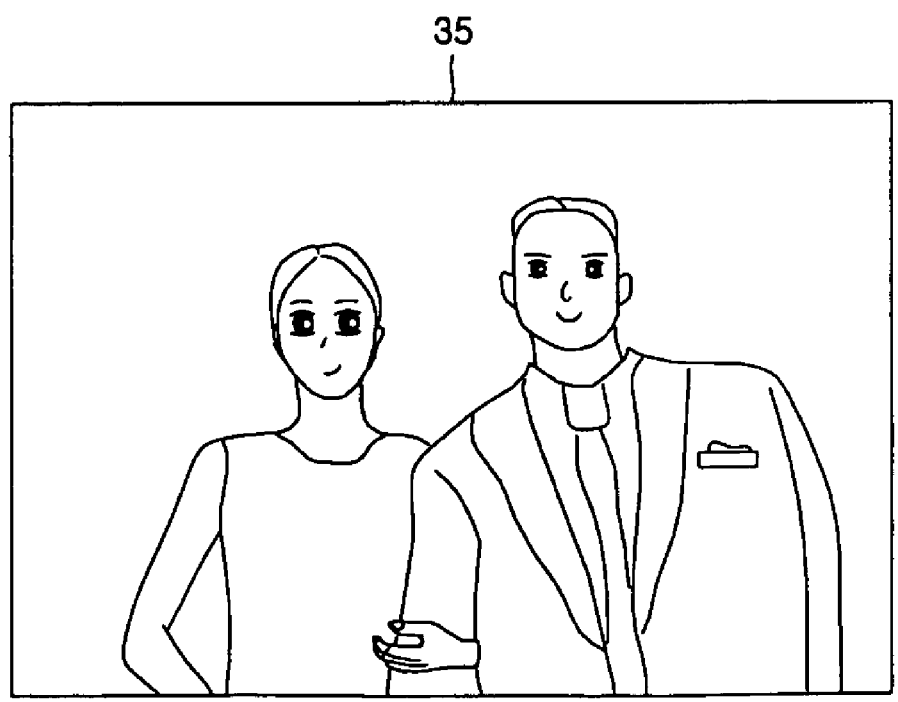
FIG. 7 is a screen on which the setting icons are no longer displayed as a result of performing operations S215 and S216.

If the operating time of the internal timer exceeds the set period of time, for example, 9 seconds, the DCP 507 disables the output of the OSD data and deletes the OSD data stored in a frame memory (S214 through S216, see FIG. 7). When the user presses a particular button after the OSD data is deleted in operations S214 through S216, the DCP 507 can redisplay the OSD data that has recently been deleted.

Figure 5:
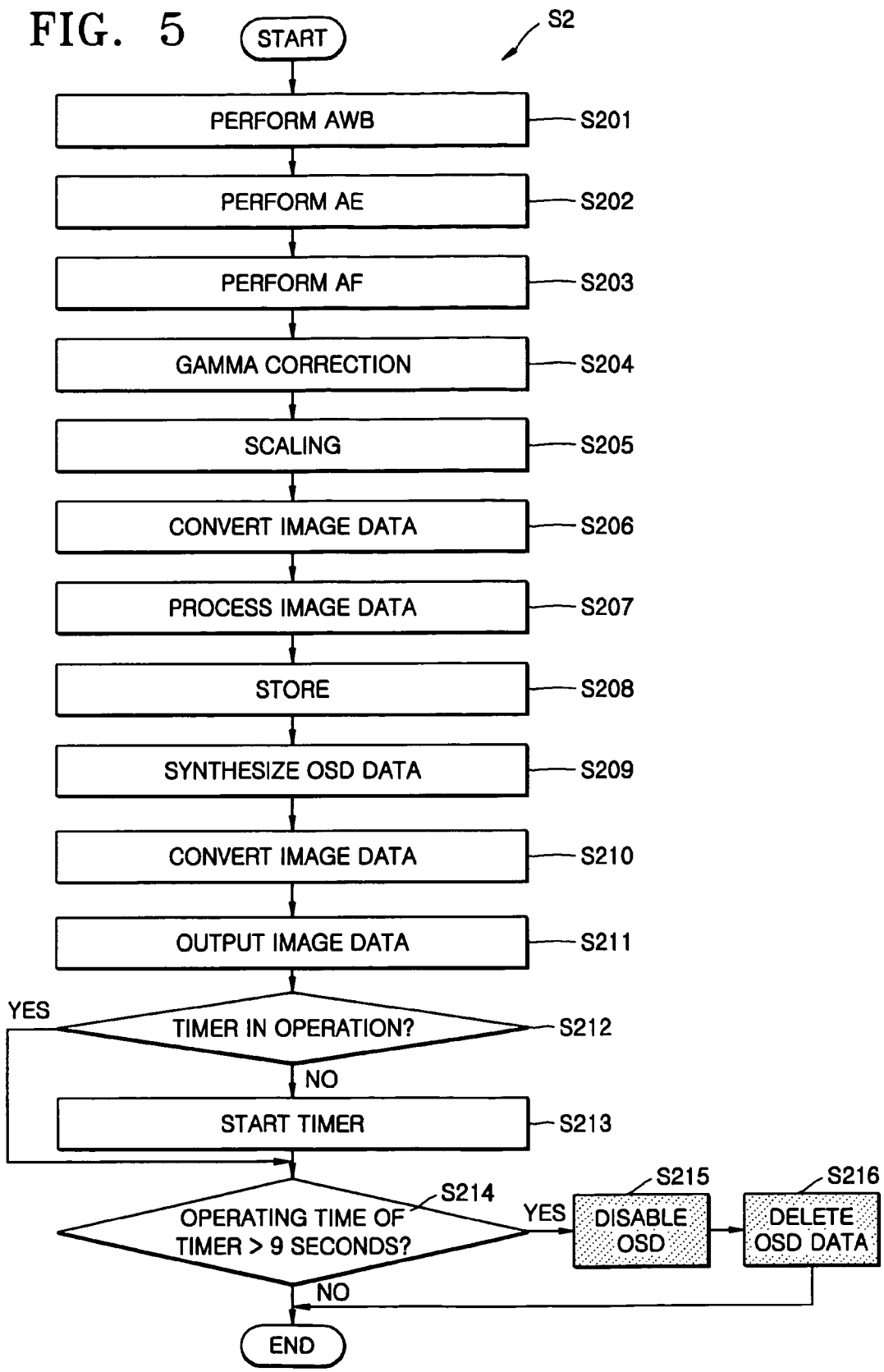
FIG. 5 is a flowchart illustrating an embodiment of the preview mode program of FIG. 4.
Figure 6:
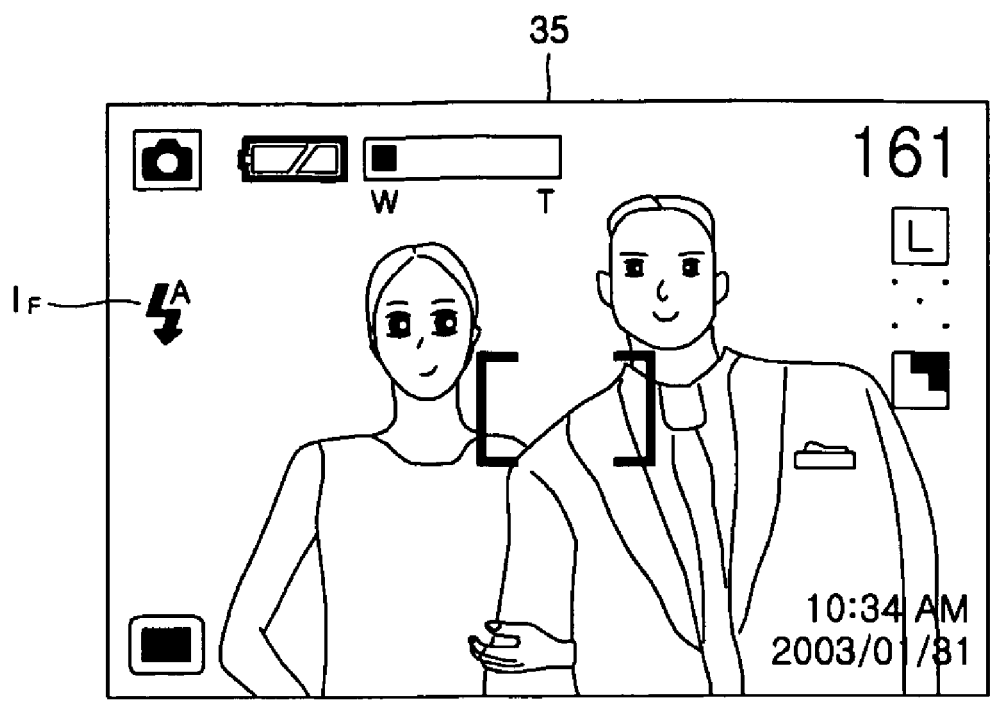
FIG. 6 is a screen on which a preview image and setting icons are displayed and overlap as a result of performing operation S211 of FIG. 5.

FIG. 6 is a screen on which a preview image and the setting icons overlap and are displayed as a result of performing operation S211 of FIG. 5. FIG. 7 is a screen on which the setting icons are no longer displayed as a result of performing operations S215 and S216.

Referring to FIGS. 6 and 7, reference numeral 35 indicates the color LCD panel and reference numeral $I_F$ indicates a setting icon. If the operating time of the internal timer exceeds a set period of time, for example, 9 seconds, the setting icons are no longer displayed since the user did not generate a signal within the set period of time. Thus, by adjusting the set period of time in advance, the user can remove the setting icons from a screen at appropriate timing without pressing additional button, for example, the monitor button 32. Accordingly, inconvenience in a photographing operation caused by displaying the setting icons can be minimized.

Figure 4:
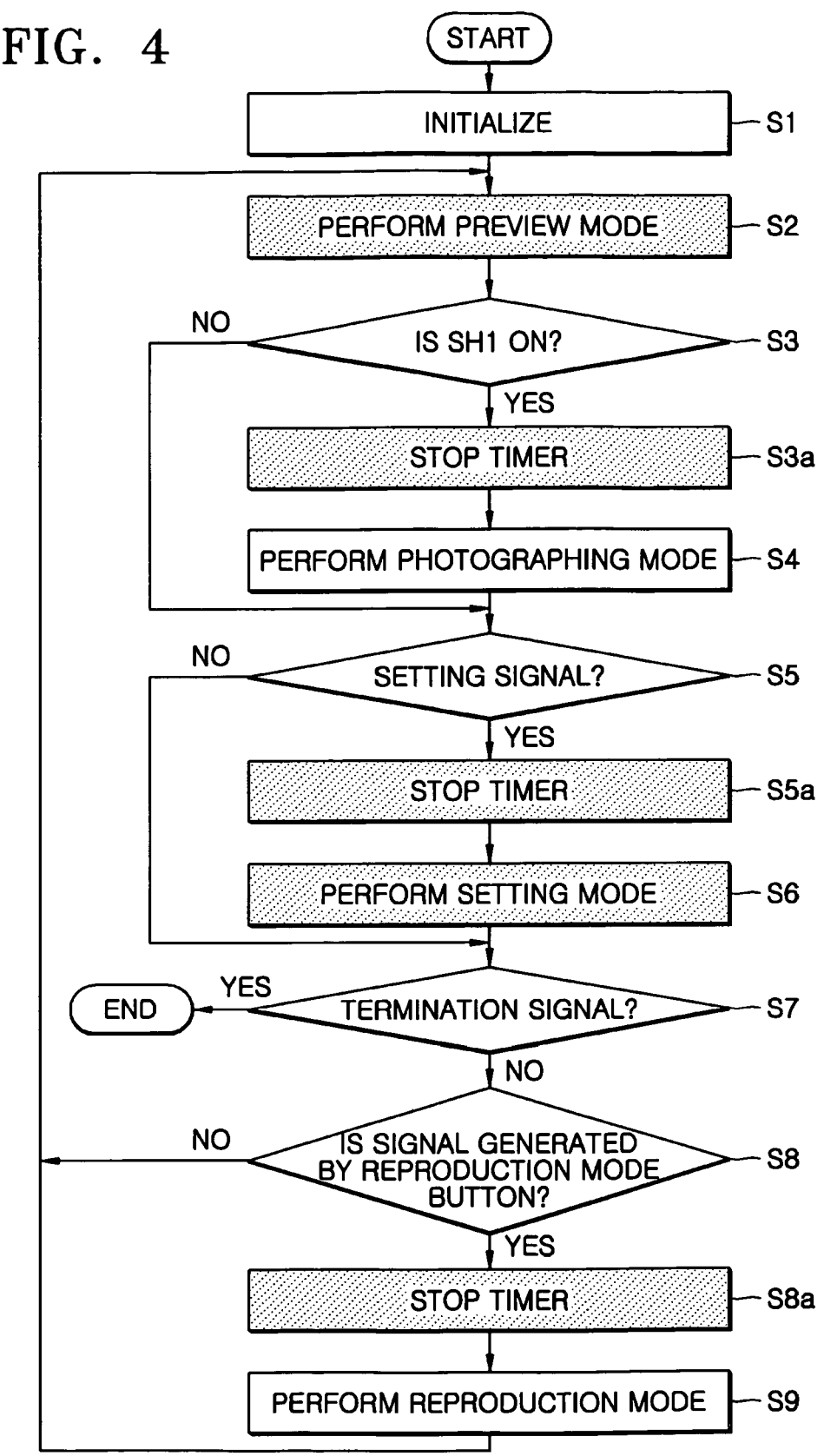
FIG. 4 is a flowchart illustrating a main program of a digital camera processor (DCP) illustrated in FIG. 3.
Figure 8:
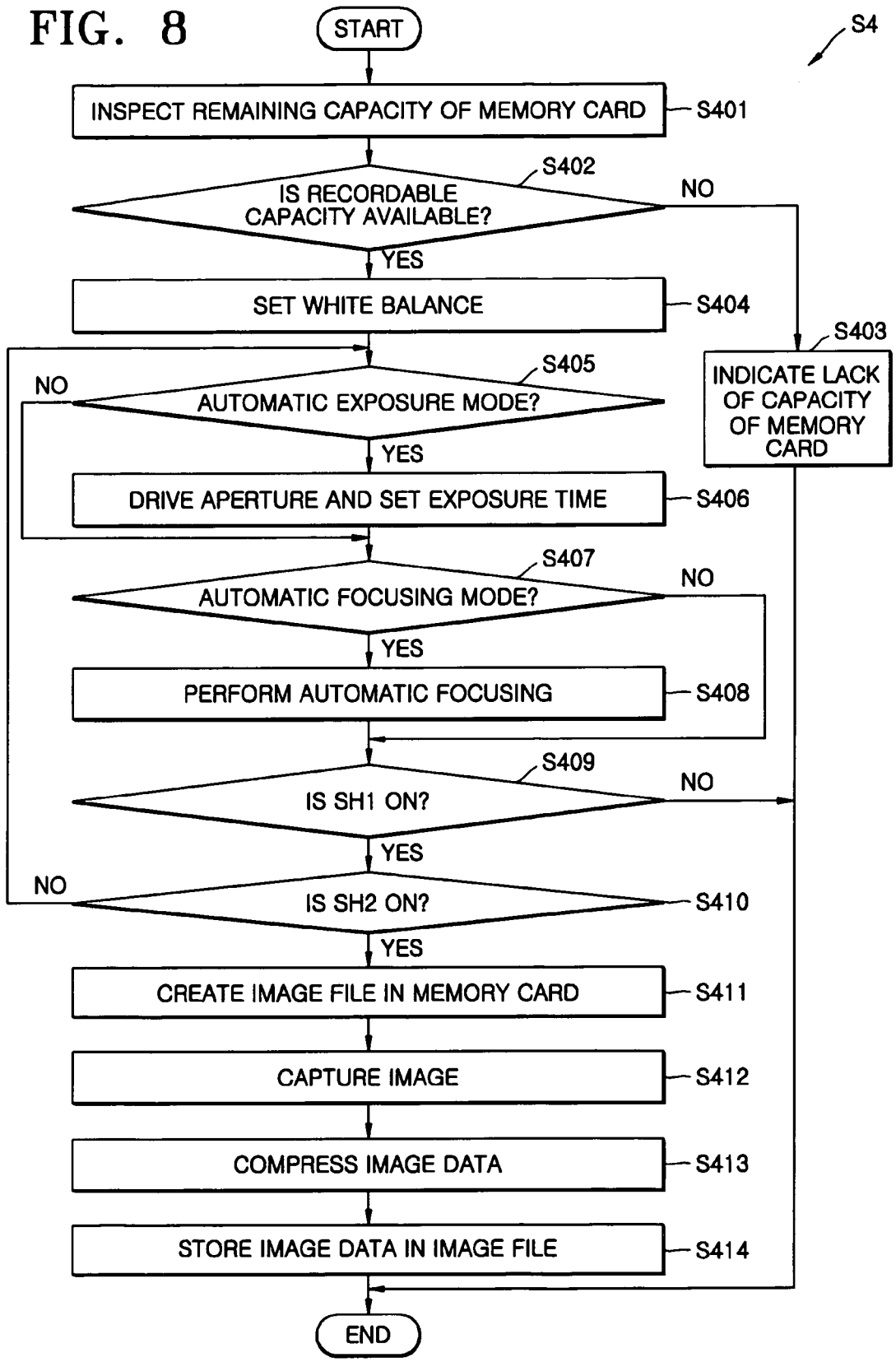
FIG. 8 is a flowchart illustrating an embodiment of the photographing mode program of FIG. 4.

FIG. 8 is a flowchart illustrating an embodiment of the photographing mode (S4) program of FIG. 4. The photographing mode (S4) program of FIG. 4 will now be described with reference to FIGS. 1 through 3 and 8. Here, the current position of the zoom lens is already set.

The DCP 507 inspects the remaining capacity of the memory card (S401) and determines whether the memory card has enough capacity to store a digital image signal (S402). If the memory card does not have enough storage capacity, the DCP 507 indicates the lack of capacity of the memory card and ends the photographing mode (S403). If the memory card has enough storage capacity, the following operations are performed.

The DCP 507 sets white balance and parameters related to the white balance according to a present photographing condition (S404). In the automatic exposure mode (S405), the DCP 507 calculates the exposure by measuring incident luminance, drives the aperture driving motor $M_A$ according to the calculated exposure, and sets exposure time (S406). In the automatic focusing mode (S407), the DCP 507 performs automatic focusing and drives the focal lens (S408).

When the first level signal SH1 from the shutter release button 13 is on (S409), the DCP 507 performs the following operations.

The DCP 507 identifies whether the second level signal SH2 is on (S410). When the second level signal SH2 is not on, it means that the user did not press the shutter release button 13 to the second level to take a photograph. Then, the DCP 507 repeats S405 through S410.

When the second level signal SH2 is on, it means that the user fully depressed the shutter release button 13 to the second level. Then, the DCP 507 creates an image file in the memory card (S411). Next, the DCP 507 captures an image (S412). In other words, the DCP 507 receives still-image data from the CDS-ADC 501. Then, the DCP 507 compresses the received still-image data (S413). The DCP 507 stores the compressed still-image data in the image file (S414).

Figure 9:
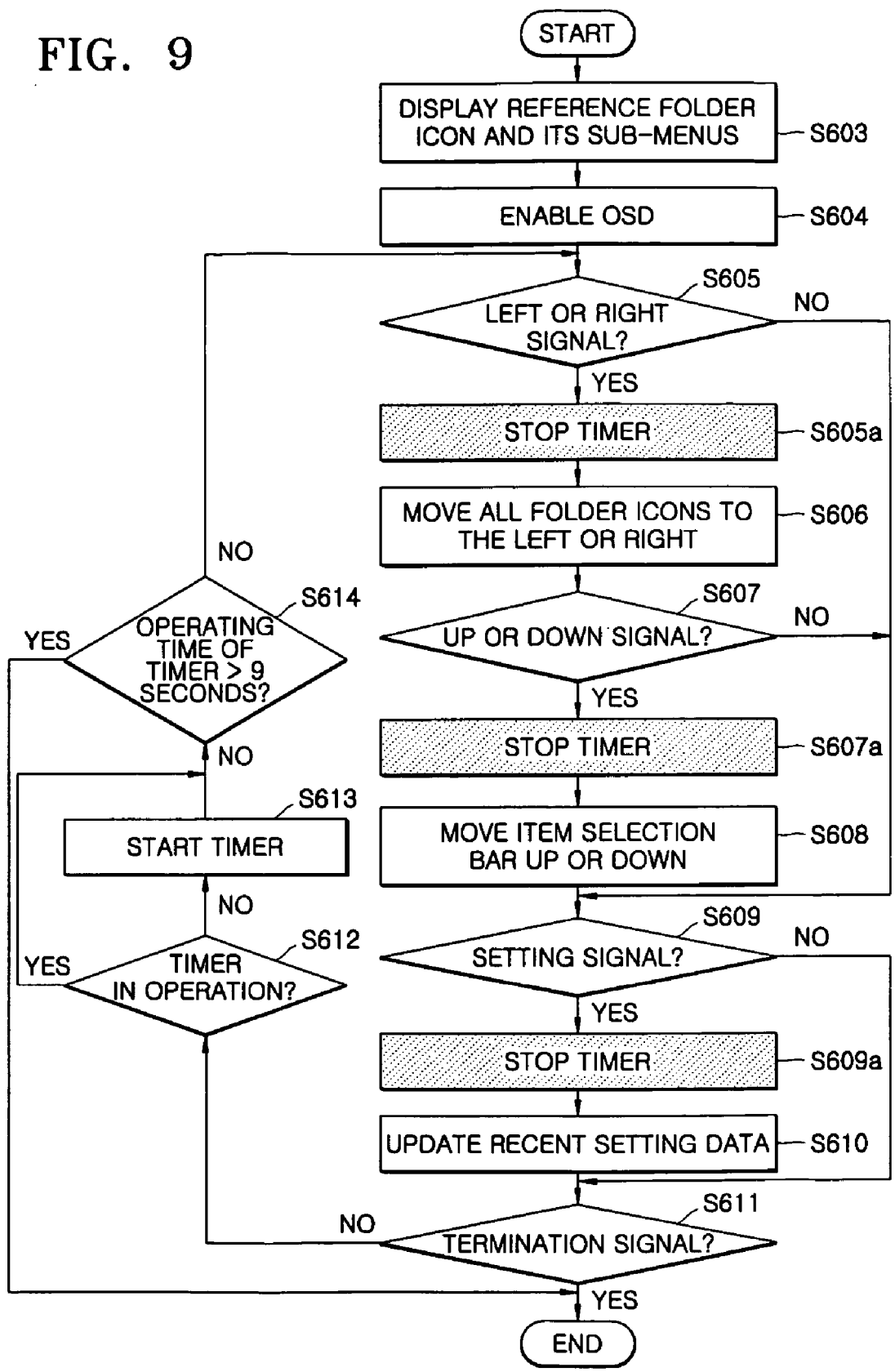
FIG. 9 is a flowchart illustrating an embodiment of the setting mode program of FIG. 4.
Figure 10:
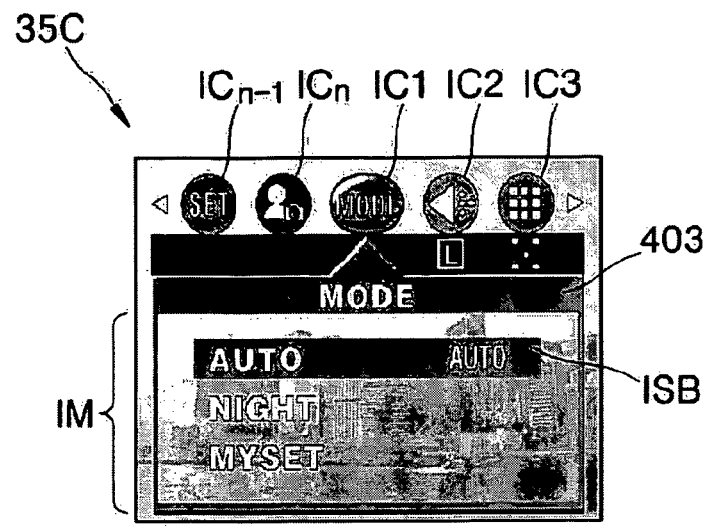
FIG. 10 is a screen on which folder icons and their submenus overlap a preview image and are displayed as a result of performing operation S603 of FIG. 9 according to an embodiment of the present invention.
Figure 11:
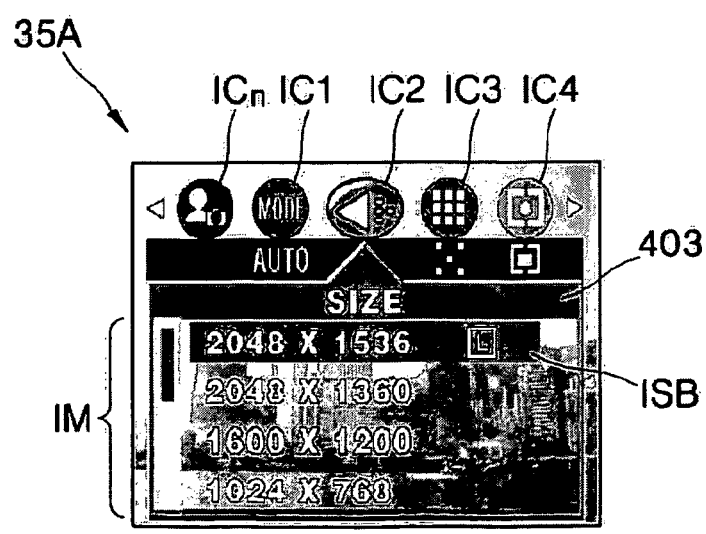
FIG. 11 is a screen showing the folder icons moved to the left or right as a result of performing operation S606 of FIG. 9.
Figure 12:
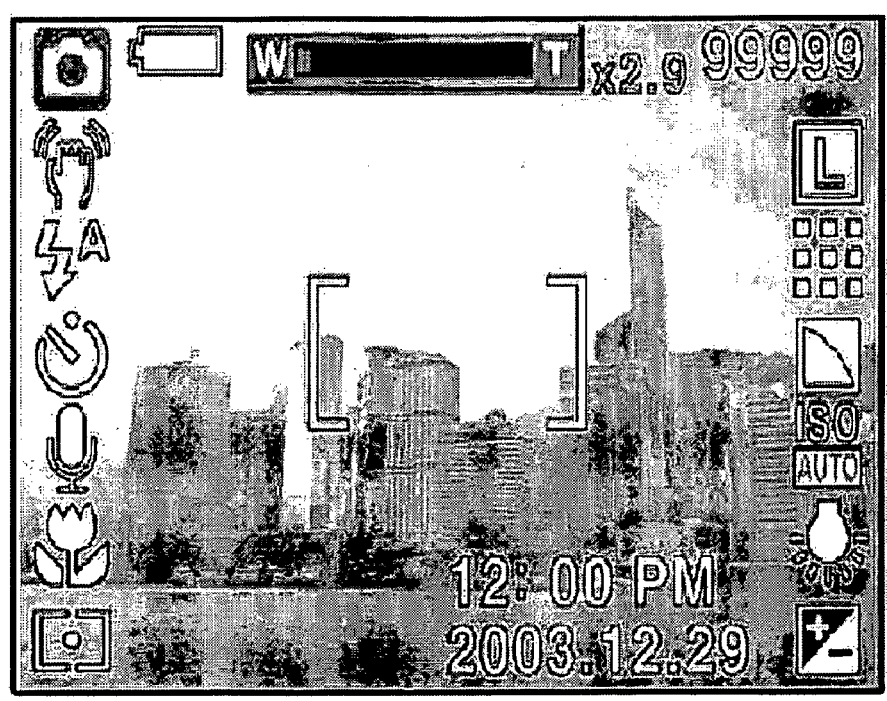
FIG. 12 is screen obtained as a result of terminating the setting mode of FIG. 9 and performing the preview mode.

FIG. 9 is a flowchart illustrating an embodiment of the setting mode (S6) program of FIG. 4. FIG. 10 is a screen on which folder icons IC1 through $IC_n$ and their sub-menus overlap a preview image and are displayed as a result of performing operation S603 of FIG. 9 according to an embodiment of the present invention. FIG. 11 is a screen showing the folder icons IC1 through $IC_n$ moved to the left or right as a result of performing operation S606 of FIG. 9. FIG. 12 is screen obtained as a result of terminating the setting mode (S6) of FIG. 9 and performing the preview mode (S2 of FIG. 4).

Referring to FIGS. 10 through 12, reference numerals 35A through 35C indicate display screens of the color LCD panel 35 of FIG. 1, reference numerals IC1 through $IC_n$ indicate folder icons for setting operating conditions of the digital camera 1, reference numeral 403 indicates folder names, IM indicates specific items as sub-menus of each folder, and ISB indicates an item selection bar. The setting mode (S6) program of FIG. 4 will now be described with reference to FIGS. 1 through 3 and 9 through 12.

The DCP 507 controls the LCD driver 514 to display a reference folder icon IC1 of FIG. 10 and its sub-menu of FIG. 10 on the color LCD panel 35 (S603, see FIG. 10). If OSD is set for each reference folder icon, the OSD is enabled (S604).

If a left signal or a right signal is input from the user input portion INP via the micro-controller 512 (S605), the DCP 507 terminates the operation of the internal timer if the internal timer is driving (S605a) because the internal timer must be driven again in the preview mode (S2) or the setting mode (S6) if the user generated a signal. The DCP 507 moves all the folder icons IC1 through $IC_n$ to the left or right (S606). In this process, the folder name 403 of an activated folder icon and the specific items IM as the sub-menus of the activated folder icon are displayed. In addition, the item selection bar ISB is displayed on a recent setting item out of the displayed specific items IM (see FIG. 11).

If an up signal or a down signal is input from the user input portion INP via the micro-controller 512 (S607), the DCP 507 terminates the operation of the internal timer if the internal timer is driving (S607a) because the internal timer must be driven again in the preview mode (S2) or the setting mode (S6) if the user generated a signal. The DCP 507 moves the item selection bar ISB up or down (S608).

If a setting signal is input from the user input portion INP via the micro-controller 512 (S609), the DCP 507 terminates the operation of the internal timer if the internal timer is driving (S609a) because the internal timer must be driven again in the preview mode (S2) or the setting mode (S6) if the user generated a signal. The DCP 507 updates recent setting data as data that overlaps the item selection bar ISB (S610).

When the termination signal is generated by the user, the DCP 507 terminates the setting mode (S611). Accordingly, the folder icons IC1 through $IC_n$ and their sub-menus are no longer displayed (compare FIGS. 11 and 12). When the termination signal is not generated, the DCP 507 continues to perform the following operations.

The DCP 507 drives the internal timer if the internal timer is not on (S612 and S613). If the internal timer is not driving and the digital camera 1 performs the preview mode (S2) right after being turned on, the internal timer is stopped in any one of operations S3a, S5a and S8a of FIG. 4 and operations S605a, S607a and S609a of FIG. 9.

If the operating time of the internal timer does not exceed a set period of time, for example, 9 seconds (S614), the DCP 507 repeats operation S605 and its subsequent operations.

Conversely, if the operating time of the internal timer exceeds the set period of time, for example, 9 seconds, the DCP 507 terminates the setting mode (S614). In other words, the folder icons IC1 through $IC_n$ and their sub-menus are no longer displayed (compare FIGS. 11 and 12). Thus, by adjusting the set period of time in advance, the user can remove the folder icons and their sub-menus from the screen at appropriate timing without pressing additional button, for example, the menu/select-confirm button $15_M$. Accordingly, inconvenience in the photographing operation caused by displaying the folder icons and their sub-menus in the user-setting mode (S6) can be minimized.

When the user presses a particular button after the folder icons IC1 through $IC_n$ and their sub-menus are deleted from the screen after the termination of the setting mode (S6), the DCP 507 can redisplay the folder icons IC1 through $IC_n$ and their sub-menus that have recently been deleted. In addition, the user may determine whether to use such an automatic icon hiding function.

As described above, according to a digital photographing apparatus and a method of controlling the same, a user can adjust a set period of time in advance, thereby removing setting icons from a screen at appropriate timing without manipulating additional buttons. Therefore, inconvenience in a photographing operation caused by displaying the setting icons can be minimized.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A digital photographing apparatus, the apparatus comprising:
   an optical system having a lens unit that receives light from a subject to be photographed by the apparatus;
   a display screen;
   a user input portion; and
   a digital processor for controlling what is displayed on the display screen,
   wherein the display screen displays a preview image that is obtained through the optical system along with setting icons in a preview mode, and wherein the display screen ceases to display all the setting icons while continuing to display the preview image that is obtained through the optical system if the digital processor does not receive a signal generated by the user input portion within a set period of time;
   wherein OSD data stored in a frame memory is deleted while continuing to display the preview image that is obtained through the optical system if the digital processor does not receive the signal generated by the user input portion within the set period of time.

2. The apparatus of claim 1, further comprising:
   a photoelectric device that converts the received light to analog electrical signals;
   an analog-to-digital conversion unit that receives the analog electrical signals and converts them to digital signals, wherein the digital processor receives and processes the digital signals; and
   a storage medium for storing a file containing a photographed image.

3. The apparatus of claim 1, wherein the set period of time is preset by a user.

4. The apparatus of claim 1, wherein the setting icons are displayed overlapping the preview image.

5. The apparatus of claim 1, wherein the user input portion comprises a button.

6. The apparatus of claim 1, wherein if less than all of the setting icons are displayed at one time, a display position for each displayed member of the setting icons is shifted in order to allow for displaying a currently undisplayed member of the setting icons.

7. The apparatus of claim 6, wherein the display positions of the displayed members of the setting icons are shifted to the right if the digital processor receives a right shift signal.

8. The apparatus of claim 6, wherein the display positions of the displayed members of the setting icons are shifted to the left if the digital processor receives a left shift signal.

9. The apparatus of claim 1, wherein the setting icons are for setting operating conditions of the apparatus.

10. The apparatus of claim 1, wherein if less than all of the plurality of icons are displayed at one time, a display position for each displayed member of the plurality of setting icons is shifted in order to allow for displaying a currently un-displayed member of the plurality of setting icons, and the shifting of the icons terminates a timer associated with the set period of time.

11. A method of controlling a digital photographing apparatus during a preview mode, the method comprising:
   displaying both a preview image that is obtained through an optical system and setting icons on a display screen;
   determining how long the setting icons have been displayed; and
   detecting whether a signal is inputted from a user input portion or not; and
   ceasing to display all the setting icons while continuing to display the preview image that is obtained through the optical system if the signal is not detected within a set period of time;
   wherein OSD data stored in a frame memory is deleted while continuing to display the preview image that is obtained through the optical system if the digital processor does not receive the signal generated by the user input portion within the set period of time.

12. The method of claim 11, wherein the setting icons are displayed such that the setting icons overlap the preview image.

13. The method of claim 11, wherein the set period of time is preset by a user.

14. The method of claim 11, further comprising:
   detecting a photographing signal from the user input portion, and in response thereto, entering a photographing mode in which the digital photographing apparatus stores a file containing a photographed image; and
   detecting a setting signal from the user input portion, and in response thereto, entering a setting mode in which the operating conditions of the digital photographing apparatus may be set.

15. The method of claim 14, wherein in the setting mode, a folder icon for setting the operating conditions of the digital photographing apparatus and its sub-menu are displayed such that the folder icon and its sub-menu overlap the preview image.

16. The method of claim 15, wherein the folder icon and its sub-menu are no longer displayed after the termination of the setting mode.

17. The method of claim 16, wherein when a setting button is pressed by a user and a signal is generated after the termination of the setting mode, the folder icon and its sub-menu are displayed, wherein the sub-menu corresponds to the setting button.

18. The method of claim 14, wherein the setting mode is terminated if a second setting signal is not detected within the set period of time.

19. The method of claim 11, wherein the setting icons are for setting operating conditions of the apparatus.

20. A digital photographing apparatus, the apparatus comprising:
   means for receiving light from a subject to be photographed by the apparatus;

means for displaying both a preview image that is obtained through the means for receiving light and setting icons in a preview mode;
means for detecting a user input;
means for determining when a set period of time has expired; and
means for ceasing the display of all the setting icons while continuing to display the preview image that is obtained through the means for receiving light when the set period of time has expired;
wherein OSD data stored in a frame memory is deleted while continuing to display the preview image that is obtained through the optical system if the digital processor does not receive the signal generated by the user input portion within the set period of time.

21. The apparatus of claim 20, the apparatus further comprising:
means for converting received light to digital signals;
means for processing the digital signals; and
means for storing an image file.

22. The apparatus of claim 20, wherein the setting icons are for setting operating conditions of the apparatus.

* * * * *

UNITED STATES PATENT AND TRADEMARK OFFICE
CERTIFICATE OF CORRECTION

PATENT NO.        : 7,649,563 B2  
APPLICATION NO.   : 11/089740  
DATED             : January 19, 2010  
INVENTOR(S)       : Seung-yun Lee It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 901 days.

Signed and Sealed this

Twenty-eighth Day of December, 2010

David J. Kappos
*Director of the United States Patent and Trademark Office*